United States Patent [19]
Takehara et al.

[11] Patent Number: 6,069,458
[45] Date of Patent: *May 30, 2000

[54] POWER SUPPLY CIRCUIT DEVICE FOR A HIGH INTENSITY DISCHARGE LAMP THAT REPETITIVELY LIGHTS THE LAMP USING A PULSE-BY-PULSE MODE CURRENT LIMITING FUNCTION

[75] Inventors: Takao Takehara, Iwata-gun; Masashi Norizuki, Shizuoka, both of Japan

[73] Assignee: Minebea Co., Ltd., Nagano, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/715,523

[22] Filed: Sep. 18, 1996

[30] Foreign Application Priority Data

Sep. 20, 1995 [JP] Japan ................................ 7-266296

[51] Int. Cl.⁷ .................................................. H05B 37/02

[52] U.S. Cl. ................................. 315/307; 315/DIG. 7; 315/248; 315/219; 315/224

[58] Field of Search ............................... 315/248, DIG. 7, 315/209 R, 219, 224, 307, 291

[56] References Cited

U.S. PATENT DOCUMENTS

| | | | |
|---|---|---|---|
| 3,691,450 | 9/1972 | Cox | 315/DIG. 7 |
| 4,277,728 | 7/1981 | Stevens | 315/307 |
| 4,415,839 | 11/1983 | Lesea | 315/247 |
| 4,585,974 | 4/1986 | Stupp et al. | 315/224 |
| 5,652,479 | 7/1997 | LoCascio et al. | 315/307 |

FOREIGN PATENT DOCUMENTS

| | | |
|---|---|---|
| 40 09 267 | 9/1990 | Germany. |
| 44 25 679 | 8/1995 | Germany. |
| WO 96/38024 | 11/1996 | WIPO. |

OTHER PUBLICATIONS

Masato H. Ohsato, et al.; New Type of Ballast for Hid Lamps Using Series Resonant Circuit; Institute of Electrical and Electronics Engineers, vol. 1; Nov. 9, 1992; pp. 191–195.

E. Rasch, et al.; Behavior of Metal Halide Lamps with Conventional and Electronic Ballasts; Journal of the Illuminating engineering Society, vol. 20; Summer 1991; pp. 88–96.

Sam Ben–Yaakov, et al.; Design and Performance of an Electronic Ballast for High Pressure Sodium (HPS) Lamps; Institute of Electrical and Electronics Engineers, vol. 2; Mar. 5, 1995; pp. 665–669.

Primary Examiner—Michael B Shingleton
Attorney, Agent, or Firm—Staas & Halsey, LLP

[57] ABSTRACT

This invention is to provide an inexpensive high intensity discharge lamp lighting device having a simplified circuit construction, which does not use a full-bridge mode inverter. The high intensity discharge lamp lighting device includes a rectifier for a power-frequency power supply, a booster chopper mode sine wave converter, a zero volt switching push pull inverter, and a high intensity lamp of a halide lamp. And, as a starting device for the halide lamp, the high intensity discharge lamp lighting device generates a high voltage (5 KV) using a resonance by a ballast choke for the inverter and a condenser connected in parallel to the halide lamp, thereby inducing a glow discharge. And, a PFM (pulse frequency modulation) circuit controls the lamp current of the halide lamp to keep it constant. And, when the AC power is turned off and turned on again, a re-lighting circuit after lighting works such that the control IC stops operation by a pulse-by-pulse mode current limiter of an inverter control IC, thereafter a soft starting circuit operates to generate a high voltage on the output of the inverter; when the lamp temperature is so high that the mercury vapor pressure inside the tube goes high and lighting cannot be started, the foregoing operation is repeated to achieve re-lighting.

6 Claims, 5 Drawing Sheets

(a) WHEN THE LAMP CURRENT IS HIGH (b) WHEN THE LAMP CURRENT IS LOW

POWER SUPPLY CIRCUIT DEVICE FOR A HIGH INTENSITY DISCHARGE LAMP THAT REPETITIVELY LIGHTS THE LAMP USING A PULSE-BY-PULSE MODE CURRENT LIMITING FUNCTION

BACKGROUND OF THE INVENTION

1. Field of the Invention

The present invention relates to a power supply circuit device for a high intensity discharge lamp lighting device to light a high intensity discharge lamp.

2. Description of the Prior Art

The power supply circuit device for the high intensity discharge lamp lighting device is used for lighting a high intensity discharge lamp such as a lamp for a projector. FIG. 4 shows a circuit diagram for a conventional high intensity discharge lamp lighting device using a high power-factor inverter. In FIG. 4, a power-frequency AC power is rectified to a direct current by a rectifier including diodes D101–D104, an inductor LF, and a condenser CF, and the output is applied to a booster chopper mode sine wave converter including a choke coil L101, a switching element SW1, a diode D105, and a condenser C. The booster chopper mode sine wave converter is connected to a full-bridge mode inverter INV as the load.

The booster chopper mode sine wave converter will briefly be explained.

In order to make the wave form of an input current Ii identical to that of the power-frequency supply voltage ei, first, a voltage ei' is detected by resisters R101, R102 to be fed to a multiplier MP1. This voltage is transferred to a current command reference Ii* having the same wave form as the voltage ei'. On the other hand, a current Ii' is detected by a resister R104 and a comparator COMP1 compares Ii' to Ii* to produce a PWM signal proportional to the difference between Ii* and Ii'. Driving a switching element SW1 of the sine-wave converter by this PWM signal achieves suppression of higher harmonics and higher power factor by the feed forward control. Further, in order to stabilize the output current of the inverter INV, a lamp current detecting resister R105 detects a lamp current IL. A variation Δ IL of the lamp current IL is obtained by a constant-current circuit, and the multiplier MP1 makes a product by Δ IL and ei' to produce the current command reference Ii*. And, a feedback circuit is configured, the amplitude of Ii* varies according to the variation of IL, i.e., Δ IL, thereby IL is stabilized and at the same time the current waveform identical to ei' can be obtained.

Thus, since the average current by each switching is proportional to the input voltage, removing higher harmonics of the switching wave form by means of a low pass filter consisting of an inductor LF and a condenser CF makes the wave form of the input current analog to the input voltage with regard to one cycle of the AC line as shown in FIG. 5, and the power factor becomes almost 1. The booster chopper mode sine wave converter is connected to the full-bridge mode inverter INV as the load. TR1–TR4 are switching transistors configuring the inverter INV. The output of the inverter INV is connected to the secondary coil of a transformer T101 and a halide lamp L (HID, hereinafter) in series.

In order to light the HID lamp L, as the entire circuit shown in FIG. 4 is powered, a timer circuit TM is activated to feed a 100 Hz starting trigger pulse to a starting pulse generator PG. The starting pulse generator PG feeds a starting pulse for about five seconds, and the starting pulse is boosted to 3–5 KV by a transformer T101. Further, the timer circuit TM feeds an inverter starting signal to an oscillator OSC, thereby the oscillator OSC starts operation, whose output activates a drive circuit DCC; which in consequence activates the inverter INV.

As the inverter INV operates, the HID lamp L enters in a lighting state, transferring the state from a glow discharge to an arc discharge. In order to control the current running through the HID lamp L into a constant value, the inverter current, i.e., the lamp current is detected by the lamp current detecting resister R105, which is fed to a control IC. And, the control IC feeds a signal to a DRIVE CIRCUIT as the control input terminal of the booster chopper mode sine wave converter so as to suppress the lamp current if it goes high and to increase the lamp current if it goes low, thus controlling the inverter INV into a constant current. Namely, if the lamp current increases by any reason, the voltage across the lamp current detecting resistor R105 will increase. Therefore, the output voltage of the booster chopper mode sine wave converter decreases by the PWM operation of the booster chopper mode sine wave converter, which maintains the constant current operation.

The foregoing conventional inverter is well known that it has restrictions for a smaller size. When lighting the halide lamp at a high frequency, the lamp current will fade out to lead the lamp to an unstable operation due to the acoustic resonance effect if the inverter INV oscillating frequency is lass than 300 KHz. Therefore, the switching frequency is selected to less than some 100 Hz not inducing the acoustic resonance. In the full-bridge mode inverter, generally, the switching frequency is apt to be less than 400 Hz due to the restriction of the switching elements such as the switching speed, thereby the transformer T1 is difficult to be made smaller.

The control circuit and the drive circuit of the full-bridge mode inverter are complicated and costly.

SUMMARY OF THE INVENTION

It is therefore an object of the present invention to provide an inexpensive high intensity discharge lamp lighting device that does not use the full-bridge model inverter and has a simplified circuit construction.

In order to solve the foregoing problem, the present invention provides the power supply circuit device for the high intensity discharge lamp lighting device described hereafter.

Namely, the power supply circuit device for the high intensity discharge lamp lighting device includes a rectifier for a power-frequency power supply, a booster chopper mode sine wave converter, a zero volt switching push pull inverter, and a high intensity lamp of a halide lamp. And, as a starting device for the halide lamp, the high intensity discharge lamp lighting device generates a high voltage (5 KV) using a resonance by a ballast choke for the inverter and a condenser connected in parallel to the halide lamp, thereby inducing a glow discharge. And, a PFM (pulse frequency modulation) circuit controls the lamp current of the halide lamp to keep it constant. And, when the AC power is turned off and turned on again, a re-lighting circuit after lighting works such that the control IC stops operation by a pulse-by-pulse mode current limiter of an inverter control IC, thereafter a soft starting circuit operates to generate a high voltage on the output of the inverter; when the lamp temperature is so high that the mercury vapor pressure inside the tube goes high and lighting cannot be started, the foregoing operation is repeated to achieve re-lighting.

Immediately after the power turns on, the resonance by the ballast choke and the condenser connected in parallel to the halide lamp generates a high voltage (5 KV) to the output of the inverter, leading to a glow discharge. And, as a result of utilizing the function of a control IC available on the market, the operation of the inverter becomes a blocking oscillation mode; consequently, the inverter generates a high voltage periodically until the halide lamp starts lighting. Thus, the re-lighting circuit can be simply constructed.

DESCRIPTION OF THE PREFERRED EMBODIMENTS

Figure 1:
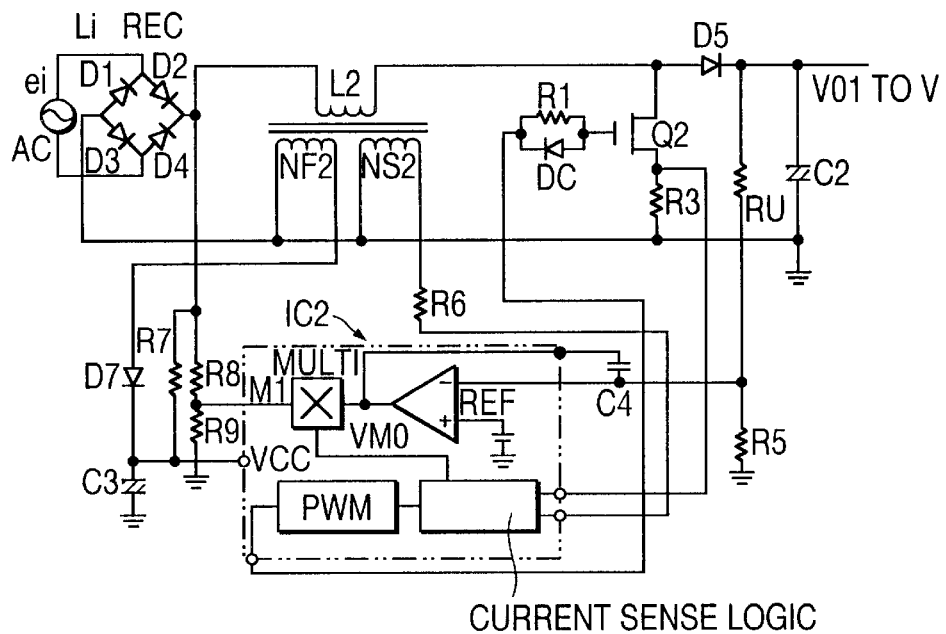
FIG. 1 is a circuit block diagram showing one embodiment of the present invention.
Figure 1:
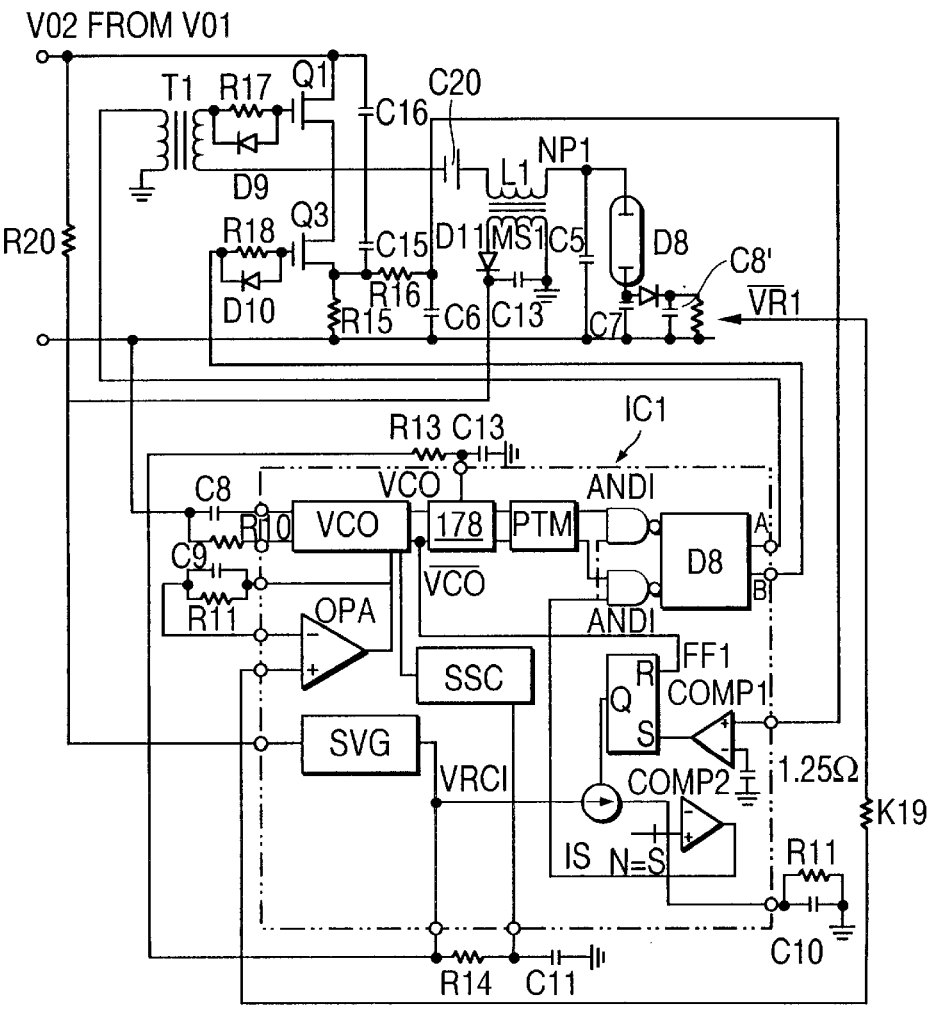

One embodiment of the present invention will hereafter be described in detail with reference to the drawings. FIG. 1 is a circuit diagram showing a high intensity discharge lamp lighting device according to the present invention. In FIG. 1, the power-frequency AC power supply is rectified by a rectifier consisting of diodes D1–D4 into a direct current, and the output is applied to a booster chopper nodesine wave converter including a choke coil L2, a power MOSFET Q2, a diode D5, and a condenser C2. A voltage resonant inverter is connected to the booster chopper mode sine wave converter as the load.

The booster chopper mode sine wave converter will briefly be described.

In order to make the wave form of an input current Ii identical to that of the power-frequency supply voltage ei, first, a voltage ei' is detected by resisters R8, R9 to be fed to a multiplier MULT. This voltage is multiplied by an output of an error amplifier to produce the output of the multiplier MULT. On the other hand, a current running through the choke coil L2 is detected by a resistor R3, and the voltage across the resistor R3 is distributed to a current sense logic circuit. If this voltage exceeds a nominal voltage determined by the output VMO of the multiplier MULT, the PWM goes OFF; consequently, the gate of the power MOSFET Q2 turns OFF. An, output of a current detecting winding Ns2 of the choke coil L2 is fed to the current sense logic circuit through a resistor R6. When the power MOSFET Q2 turns OFF, the current through the choke coil decreases and go down to zero, the output of the current detecting winding Ns2 is reversed in phase, turning the power MOSFET Q2 ON. A resistor R7 is a starting resistor. As a control IC IC2 operates, the power MOSFET starts the switching operation, and a voltage generated across the control winding Nf2 is rectified by a diode D7 and a condenser C3 into a direct current, which supplies a power to the control IC IC2. A resistor R1 is a gate drive resistor for the power switching element Q2, a diode D6 is to pull down charges stored between the gate and the source of the power switching element Q2. Since the output voltage of the booster chopper mode sine wave converter is made constant, the input voltage of the zero volt switching push pull inverter connected as the load becomes constant; and usually the halide lamp is used without adjusting intensity (at a constant lamp current), the lamp power is controlled constant, and the switching frequency of the inverter becomes constant.

Figure 2:
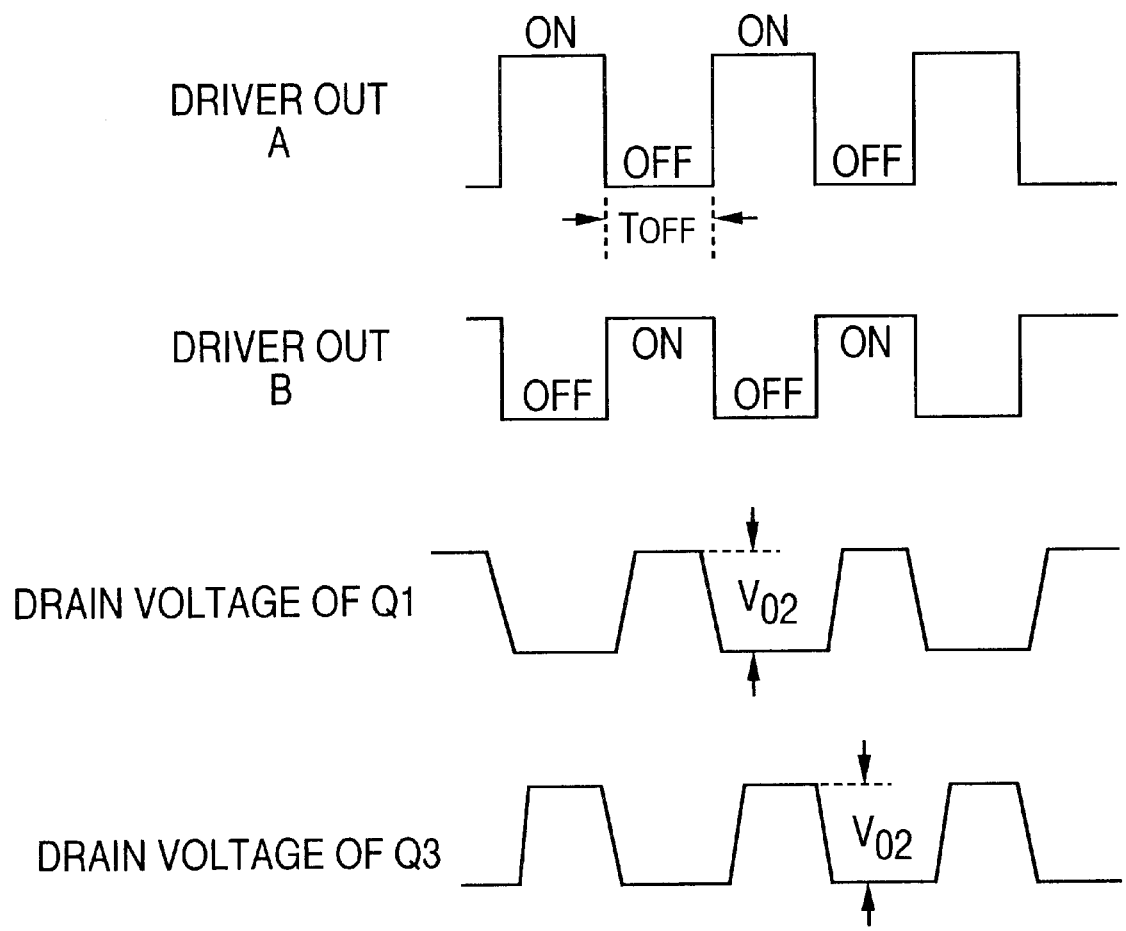
FIG. 2 is a wave form chart showing a driver output signal and output wave form of a power switching element.

Next, the zero volt switching push pull inverter will be described in detail. In FIG. 1, L1 is a ballast choke having a primary coil np1 and a secondary coil ns2, of the zero volt switching push pull inverter. IC1 is a zero volt switching power supply controller composed of an integrated circuit. This IC1 is available on the market, for example, Micro Linear ML4816. Q1, Q3 are power switching elements (power MOSFET). A resistor R20 is a starting resistor, when the system is powered, the zero volt switching power supply controller IC1 is supplied with power to operate. This zero volt switching power supply controller IC1 includes a voltage controlled oscillator VCO, one-shot multi-vibrator MV, pulse frequency modulator PFM, driver DB, soft start controller SSC, comparator COMP1, COMP2, flip flop FF1, constant current source IS, error amplifier OPA, and reference voltage generator 5 VG for generating a 5 Volt reference voltage VREF. The outputs A, B of the driver DB operate complimentary. The outputs A and B of the driver DB drive the power switching element Q1 and Q3, respectively. FIG. 2 illustrates the operational timing chart. The connecting point of the source of the power switching element Q1 with the drain of the Q3, i.e., the output of the inverter is connected in series to a DC decoupling condenser C20 connecting in series with the ballast choke L1.

A starting condenser C5 is connected between the output of the ballast choke L1 and the ground. The foregoing condenser C5 is connected in parallel to a halide lamp L connecting in series with a current detecting condenser C7.

It is a conventional practice to vary the input voltage of the full-bridge mode inverter, i.e., the output voltage of the booster chopper mode sine wave converter according to the value of the discharge current, in order to control the discharge current of the halide lamp into a constant value. However, the present invention applies the zero volt switching push pull inverter to drive the halide lamp and performs the constant current control.

The operation of the embodiment according to the present invention will now be described. At the moment when the AC power is supplied to the bridge rectifier REC, the HID lamp L does not light, and since the current does not flow through this lamp L, the voltage across the current detecting condenser C7 is 0 V. When the HID lamp lights in a normal operating condition, a voltage is applied across the current detecting condenser C7, and this voltage is rectified by a diode DS and condenser C8' positive terminal of an error op-amplifier as a to be fed to a control input of the control IC. When the Ac power is supplied, a condenser C11 is charged through a resistor R14 and the voltage across the condenser C11 increases. The condenser C11 is connected to the soft start controller SSC. The output of the soft start controller SSC is in HIGH level directly after the power turning ON. Since the output is connected to the control input of the voltage controlled oscillator VCO, the output of the voltage controlled oscillator VCO goes higher than that in the steady state operation. As the voltage across the condenser C11 increases, the output of the soft start controller SSC is designed to decrease; and the oscillating frequency of the voltage controlled oscillator VCO gradually lowers. When the voltage across the condenser C11 goes up, output voltage of the soft start controller SSC goes down to less than the threshold voltage Vth, the output of the soft start controller SSC goes into an open state and the voltage controlled oscillator VCO is controlled only by the output of the error amplifier OPA. Namely, when the Ac power is turned ON, the voltage controlled oscillator VCO starts operation at a higher frequency than that in the steady state operation; and therefore, the current stress in the power switching elements Q1, Q3 and the ballast choke L1 can be restrained lower.

Next, the method of starting the HID lamp will be described. Immediately after the AC power is supplied, the HID lamp L is not lighted and the internal impedance of the lamp is high. Selecting the value of the ballast choke L1 and the starting condenser C5 so as to set the resonance frequency by these two components to, for example, 300 KHz will produce a high voltage (5 KV) of a 300 KHz sine wave across the condenser C5, thereby starting a glow discharge in the HID lamp L. As the voltage across the HID lamp L becomes a discharge maintaining voltage (about 100 V), the choke coil L1 is a ballast inductor loaded with the voltage difference between the output (connecting point of the source of the power switching element Q1 and the drain of the power switching element Q3) voltage of the inverter and the discharge maintaining voltage.

To control the current running through the halide lamp L into a constant value is conducted such that the lamp current is detected by the detecting condenser C7, the voltage across the condenser C7 is rectified and smoothed by the diode D8 and the condenser C8', and the smoothed DC voltage is applied to the control input of the zero volt switching power supply controller IC1. Namely, if the lamp current increases by any reason, the voltage across the detecting condenser C7 increases. Therefore, the output voltage of the error amplifier OPA of the zero volt switching power supply controller IC1 increases. Consequently, the oscillating frequency of the voltage controlled oscillator VCO goes high and the lamp current decreases. A variable resistor VR1 is to set the lamp current. R17, R18 are gate drive resistors for the power switching elements Q1, Q3; D9, D10 are to pull down charges stored between the gate and the source of the power switching element Q1 and 03, respectively. A diode D11 and a condenser C13 forms a rectifier for the power supply to the zero volt switching power supply controller IC1. R20 is a starting resistor.

Figure 3:
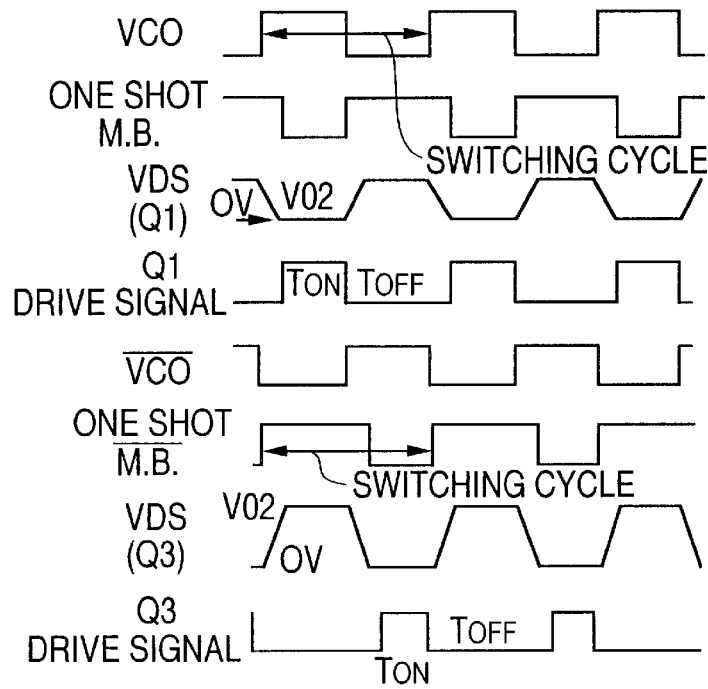
FIG. 3 is a wave form chart showing wave forms of the parts of the high intensity discharge lamp lighting device dividing into the case of a small lamp current and a large current.
Figure 3:
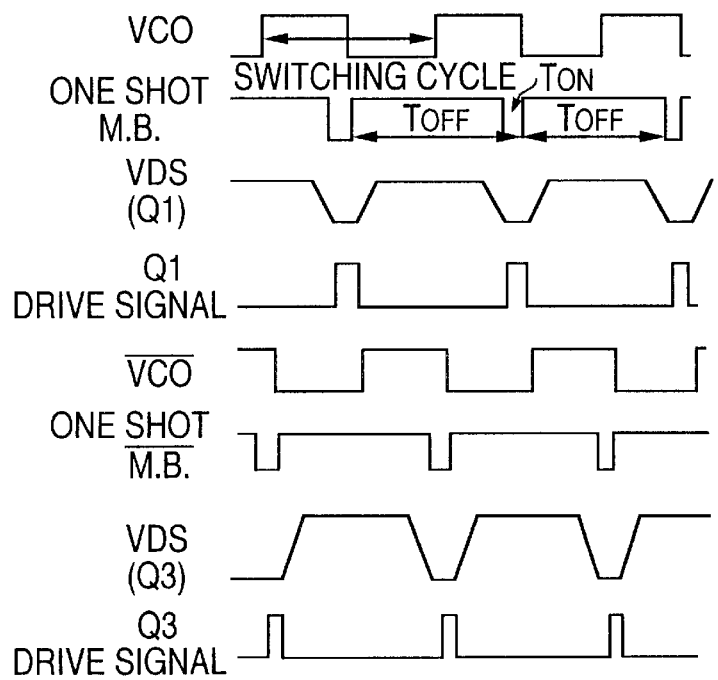
Figure 4:
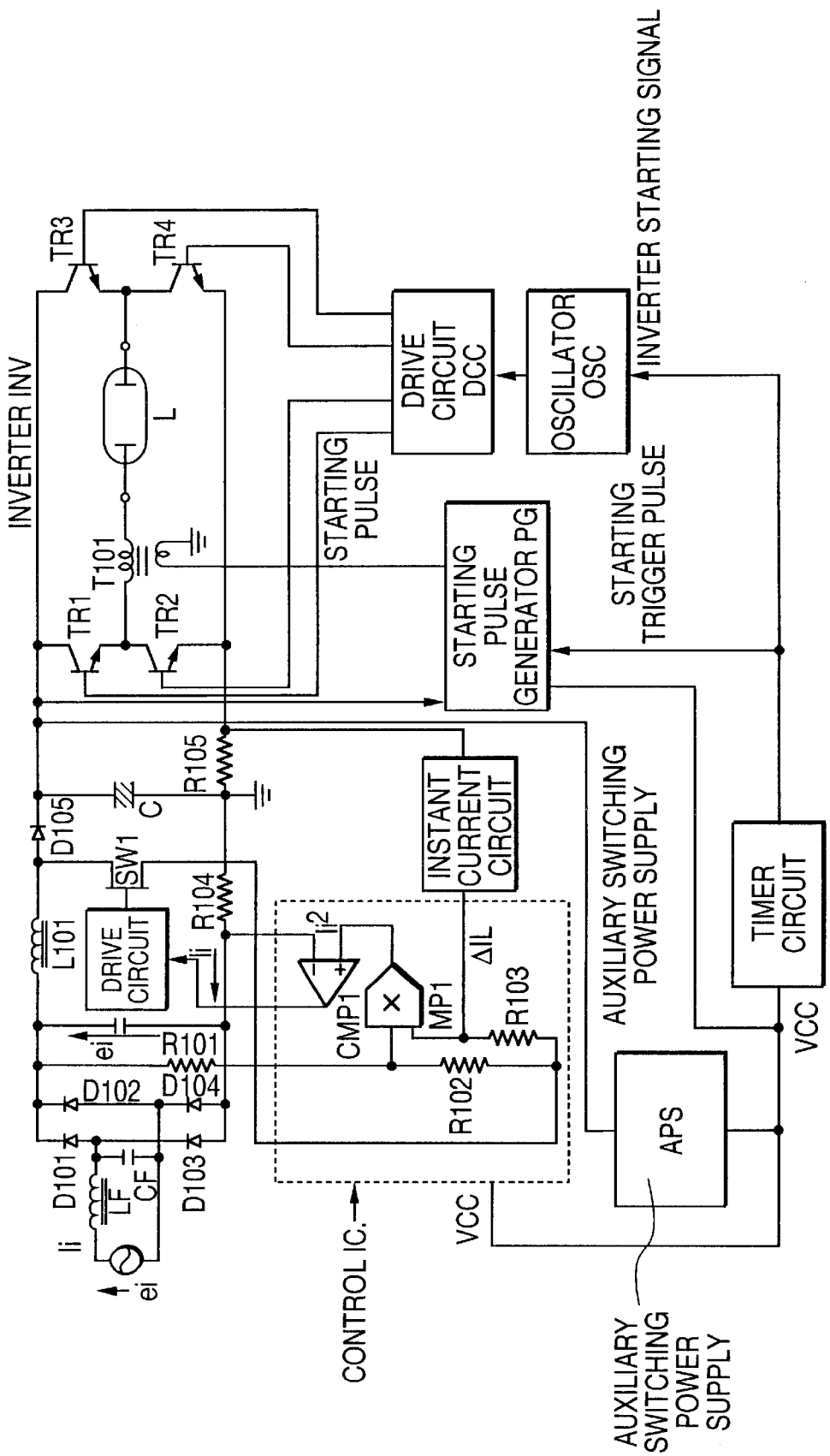
FIG. 4 is a circuit block diagram showing a conventional high intensity discharge lamp lighting device.
Figure 5:
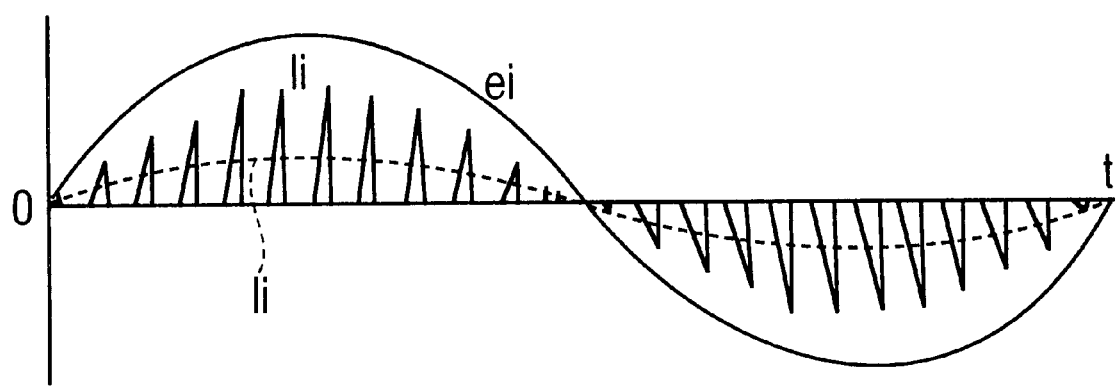
FIG. 5 is a wave form chart showing wave forms of the input voltage and the current of the converter.

The operation of the zero volt switching power supply controller IC1 will be described in detail with reference to FIGS. 1 and 3. As the discharge current (lamp current) of the HID lamp L is increased by any reason, the output of the error amplifier OPA increases and the oscillating frequency of the voltage controlled oscillator VCO goes high. The fall of output of the voltage controlled oscillator VCO puts the one-shot MB of the one-shot multi-vibrator MB into the set state, the output of which goes HIGH level. Similarly, the fall of the phase-reversed output voltage controlled oscillator (bar) of the voltage controlled oscillator VCO puts the one-shot MB (bar) of the one-shot multi-vibrator into the set state, the output of which goes HIGH level. A resistor R12 and a condenser C12 are to determine the pulse width of the output of the one-shot multi-vibrator, and the output of the one-shot MB is maintained in a high level during the time Toff determined by the Lime constant. That is, with maintaining the Toff constant, pulse frequency control is performed which varies the oscillating frequency (i.e., switching frequency) of the voltage controlled oscillator VCO.

While the power switching element Q1 is on, the ballast choke L1 and the capacitance CS (CS=C15+Coss; Coss= output capacitance of Q3) between the drain and source of the power switching element Q3 resonate to sinusoidally increase the voltage Vds between the drain and source of the power switching element Q3. When Vds exceeds the power supply voltage VO2, a body diode of the power switching element Q1 turns ON, Vds is clamped to the power supply voltage VO2. ZVS (zero-volt switching) is formed by selecting the value of the condenser CS such that the time until Vds becomes 0 V is within the time Toff. When the power switching element Q3 is ON, the operation is the same. A condenser C8 and a resistor R10 are to determine an oscillating frequency of the voltage controlled oscillator VCO. A resistor R11 and a condenser C9 is for phase compensation of the error amplifier OPA. A transformer T1 is for gate drive of the power switching element Q1.

Nest, the method of re-lighting the HID lamp L will be described. When the AC power turns OFF in the state of the HID lamp being lighted and again turns ON, since the vapor pressure inside the tube of the HID lamp L is high, a considerably high starting voltage is needed compared to cold starting. And, the internal impedance of the HID lamp L is low. A current detecting resistor R15 connected in series to the power switching element Q3 detects the drain current of the element Q3, which is distributed through a low pass filter composed of a resistor R16 and a condenser C6 to the +input of the comparator COMP1 of the pulse-by-pulse mode current limiter. When the AC power is again turned ON, the control IC1 starts a soft start operation. When the voltage across the current detecting resistor R15 exceeds the threshold voltage 1.25 V of the comparator COMP1, the output of the comparator COMP1 becomes a high level to put the flip flop FFi into a set state. The output of the flip flop FF1 controls the constant current source IS to turn ON and OFF, and the flip flop FF1 is to set, and output Q is to high the constant current source IS is opened and charges a condenser C10. The flip flop FF1 is reset every one cycle of the oscillating frequency. If the power switching element Q3 continues to flow an excessive current, the voltage across the condenser C10 goes high. Since the condenser C10 is connected to the +input of the comparator COMP2, when the voltage exceeds the threshold voltage 3.2 V of the comparator COMP2, COMP2 becomes a high level; closing AND gate, AND1, and AND2 leads the output of the driver DB to a low level. Thus, the oscillation stops, and the power supply voltage to the control IC IC1 lowers. On the other hand, IC1 starts operation by the starting resistor R20, the foregoing operation is repeated. That is, it starts a blocking oscillation mode. In this state, the temperature inside the tube of the HID lamp L falls, mercury vapor pressure lowers to increase the internal resistance, thus maintaining the state to finally enabling a glow discharge.

According to the present invention, by combining the booster chopper mode sine wave converter and zero volt switching push pull inverter, a power MOSFET having a lower withstand voltage (having a lower ON resistance) can be used, A simplified starting circuit can be configured using a ballast choke and a condenser. Utilizing the pulse-by-pulse mode current limiting function of the zero volt switching power supply controller available on the market realized the restarting of the HID lamp in a blocking mode. As, the input voltage of the inverter is made constant the switching frequency of the inverter can be made constant, thereby reducing interference to other equipment.

We claim:

1. A power supply circuit device for a high intensity discharge lamp light having a booster chopper mode sine wave converter converting DC-DC, a voltage resonant inverter for generating an AC with variable frequencies connected to the sine wave converter, a high intensity halide lamp connected to the voltage resonant inverter, comprising:

a soft start controller having means for gradually decreasing a frequency of an output signal of the voltage resonant inverter in response to the power supply circuit device being started;

a detector detecting a light-out condition of the high intensity halide lamp from a load current of the voltage resonant inverter having two power switching elements having a push-pull connected circuit;

means for counting to a fixed time after the detector detects a light-out condition of the high intensity halide lamp;

a stopper stopping the voltage resonant inverter after the fixed time is reached;

a restarter restarting the voltage resonant inverter after the fixed time is counted to from a time when the voltage resonant inverter is stopped; and means for detecting a current of the high intensity halide lamp; and means for controlling the current of the high intensity halide lamp, wherein when the detected current is increased, the frequency of the output signal of the voltage resonant inverter is decreased and when the detected current is decreased, the frequency of the output signal of the voltage resonant inverter is increased.

2. A power supply circuit device for a high intensity discharge lamp light as claimed in claim 1, wherein a power supply circuit for the inverter includes a power factor improvement circuit.

3. A high intensity discharge lamp light device as claimed in claim 1, wherein the frequency of the inverter is adjusted so that the power supply to the halide lamp can maintain a specified level in a steady-state operation.

4. A high intensity discharge lamp light device as claimed in claim 1, the power switching elements each include a pair of MOSFETs.

5. A high intensity discharge lamp light device as claimed in claim 4, further comprising a voltage-controlled oscillator to drive the power switching elements and to apply gate signals, each having a 180° phase difference, to the pair of the power switching elements.

6. A Power supply circuit device for a high intensity discharge lamp light as claimed in claim 1, further comprising a zero volt switching power controller IC having a pulse-by-pulse mode current limiting function to relight the halide lamp in a blocking oscillating mode.

* * * * *